United States Patent
Koch et al.

(10) Patent No.: US 8,498,798 B2
(45) Date of Patent: Jul. 30, 2013

(54) METHOD FOR THE OPERATION OF AN INTERNAL COMBUSTION ENGINE COMPRISING AN EMISSION CONTROL SYSTEM THAT INCLUDES AN SCR CATALYST

(75) Inventors: Thomas Koch, Boeblingen (DE); Alexander Massner, Esslingen (DE); Anke Traebert, Stuttgart (DE)

(73) Assignee: Daimler AG, Stuttgart (DE)

( * ) Notice: Subject to any disclaimer, the term of this patent is extended or adjusted under 35 U.S.C. 154(b) by 182 days.

(21) Appl. No.: 13/148,155

(22) PCT Filed: Jan. 26, 2010

(86) PCT No.: PCT/EP2010/000430
§ 371 (c)(1), (2), (4) Date: Sep. 21, 2011

(87) PCT Pub. No.: WO2010/089039
PCT Pub. Date: Aug. 12, 2010

(65) Prior Publication Data
US 2012/0004825 A1    Jan. 5, 2012

(30) Foreign Application Priority Data
Feb. 6, 2009 (DE) .................... 10 2009 007 765

(51) Int. Cl.
*F02D 41/14* (2006.01)
*F02D 41/04* (2006.01)

(52) U.S. Cl.
USPC ................. 701/103; 701/113; 123/676

(58) Field of Classification Search
USPC .......... 123/568.11, 676, 559.1, 316; 701/103, 701/104, 105, 108, 113; 60/274, 276, 301, 60/295
See application file for complete search history.

(56) References Cited

U.S. PATENT DOCUMENTS

| | | | |
|---|---|---|---|
| 6,209,313 B1 | 4/2001 | Wissler et al. | |
| 6,758,034 B1 | 7/2004 | Winkler et al. | |
| 6,928,806 B2 * | 8/2005 | Tennison et al. | 60/286 |
| 7,431,895 B2 | 10/2008 | Pfeifer et al. | |

(Continued)

FOREIGN PATENT DOCUMENTS

| | | |
|---|---|---|
| DE | 197 49 400 A1 | 5/1999 |
| DE | 100 54 877 A1 | 5/2002 |

(Continued)

OTHER PUBLICATIONS

Corresponding International Search Report with English Translation dated May 7, 2010 (ten (10) pages).

(Continued)

*Primary Examiner* — Mahmoud Gimie
(74) *Attorney, Agent, or Firm* — Crowell & Moring LLP (57) ABSTRACT

A method for operating an internal combustion engine comprising an exhaust gas cleaning system that includes a SCR catalyst. In conjunction with a cold start and/or a warm-up of the internal combustion engine, the internal combustion engine is operated using a cold start engine operation method having predefineable values for predefineable operating parameters of the internal combustion engine. An amount of nitrogen oxides stored in the SCR catalyst is estimated, and the cold start engine operation method is activated when the estimation indicates that the nitrogen oxide storage amount exceeds a predefineable nitrogen oxide storage amount limit value.

20 Claims, 3 Drawing Sheets

U.S. PATENT DOCUMENTS

| | | |
|---|---|---|
| 8,133,444 B2 | 3/2012 | Toshioka et al. |
| 2004/0203162 A1* | 10/2004 | Wickert .......................... 436/55 |
| 2006/0130458 A1* | 6/2006 | Solbrig .......................... 60/286 |
| 2006/0153761 A1 | 7/2006 | Bandl-Konrad et al. |
| 2009/0151332 A1* | 6/2009 | Toshioka et al. ................ 60/286 |
| 2011/0146235 A1* | 6/2011 | Hagimoto et al. .............. 60/274 |

FOREIGN PATENT DOCUMENTS

| | | |
|---|---|---|
| DE | 103 24 013 A1 | 12/2004 |
| DE | 10 2006 014 073 A1 | 10/2007 |
| DE | 10 2006 041 676 A1 | 3/2008 |
| EP | 0 979 935 A2 | 2/2000 |
| EP | 2 009 268 A1 | 12/2008 |
| JP | 2007-222742 A | 9/2007 |
| JP | 2007-255304 A | 10/2007 |
| KR | 10-0836338 B1 | 6/2008 |
| RU | 2247251 C2 | 2/2005 |
| WO | WO 2004/061278 A1 | 7/2004 |
| WO | WO 2008/126924 A1 | 10/2008 |

OTHER PUBLICATIONS

Form PCT/ISA/237 (seven (7) pages).
Russian Office Action dated Feb. 6, 2013 (ten (10) pages).
Japanese Office Action dated Feb. 27, 2013 (four (4) pages).

\* cited by examiner

METHOD FOR THE OPERATION OF AN INTERNAL COMBUSTION ENGINE COMPRISING AN EMISSION CONTROL SYSTEM THAT INCLUDES AN SCR CATALYST

BACKGROUND AND SUMMARY OF THE INVENTION

The invention relates to a method for operating an internal combustion engine with an exhaust gas cleaning system comprising a SCR catalyst.

Internal combustion engines with an exhaust gas cleaning system comprising a SCR catalyst generally require that the SCR catalyst reaches its operating temperature necessary for nitrogen reduction as quickly as possible. For this, German Patent document DE 197 49 400 A1 discloses determining an efficiency for the SCR catalyst and changing certain internal combustion engine operation variables when it falls below a predetermined value in such a manner that the nitrogen oxide content in the untreated exhaust gas is reduced and the exhaust gas temperature and the temperature of the SCR catalyst is thus increased. However, a heating of the SCR catalyst, particularly in connection with a cold start or warm-up of the internal combustion engine, can lead to an undesirably high emission of particularly damaging nitrogen dioxide ($NO_2$) even with a tolerable value for the total emission of nitrogen oxides ($NO_x$).

Exemplary embodiments of the present invention provide a method for operating an internal combustion engine with an exhaust gas cleaning system comprising a SCR catalyst, where a discharge of $NO_2$ to the environment, particularly in connection with a cold start or a warm-up of the internal combustion engine, is reliably limited to tolerable low values.

With the method according to the invention for operating an internal combustion engine with an exhaust gas cleaning system comprising a SCR catalyst, a nitrogen oxide storage amount of nitrogen oxides stored in the SCR catalyst is estimated, and if the estimate results in the nitrogen oxide storage amount exceeding a predefinable nitrogen oxide storage amount limit value the internal combustion engine is operated with a cold start engine operation method with predefineable values for predefineable internal combustion engine operation variables. The specific cold start engine operation method provided in the SCR catalyst when a nitrogen oxide storage amount exceeds the nitrogen oxide storage amount limit value, however, preferably does not find a use or at the most a use in a changed form, if, or as long as the nitrogen oxide storage amount limit value is fallen below. An excess fuel consumption can thereby be avoided, which typically adjusts with the provided specific cold start engine operation method, if this is not necessary from the view of the $NO_x$ emission which is viewed to be particularly critical.

The inventors have recognized that an undesirably high emission of $NO_2$ is caused in the first instance by an amount of nitrogen oxides (NOx) stored in the SCR catalyst that is too high. The stored $NO_x$ can be present in physisorbed or chemisorbed form or also in a chemically bound form, for example as a nitrous acid. It was noticed surprisingly that $NO_x$ stored in the SCR catalyst desorbs mainly as $NO_2$ with a heating of the SCR catalyst, whereas the NO part of the desorbed $NO_x$ is considerably lower. Due to the increased harmfulness of $NO_2$ compared to NO, it is thus particularly desired to limit the $NO_2$ emission. By means of the estimate of the nitrogen oxide storage amount carried out according to the invention, the risk of an undesired high $NO_2$ desorption due to a heating of the SCR catalyst in connection with cold start or a warm-up of the internal combustion engine can also be estimated. If the nitrogen oxide storage amount exceeds the critical nitrogen oxide storage amount limit value, the cold start engine operation method according to the invention is activated. A heating of the SCR catalyst thereby takes place so early that the $NO_2$ emission is limited to predefineable values. On the other hand, the cold start engine operation method according to the invention permits adjustment of a heating speed of the SCR catalyst in a defined manner, so that the $NO_2$ emission is limited to predefineable values.

In an arrangement of the invention, values of internal combustion operation variables are preset with an activated cold start engine operation method in such a manner that the SCR catalyst is heated by the exhaust gases emitted by the internal combustion engine in such a manner that a predefineable desorption rate value for a rate of nitrogen dioxide desorbing from the SCR catalyst resulting due to the heating of the SCR catalyst or a predefineable maximum concentration of $NO_x$ nitrogen dioxide in the exhaust gas emitted to the environment is fallen below. It was noticed that a fast heating of a SCR catalyst loaded with stored nitrogen oxides can result in a quickly increasing desorption of $NO_2$, that is, a high desorption rate. This is particularly the case if a desorption temperature region of typically +10° C. to +60° C. is reached or passed through during the heating. Depending on the height of the nitrogen oxide storage amount, a greater or lower high maximum concentration of $NO_2$ in the exhaust gas emitted to the environment results therefrom. It is thus particularly preferred if a predefineable heating gradient maximum value for a heating gradient of the SCR catalyst is fallen below with a heating of the SCR catalyst in a further arrangement of the invention. By means of the values of internal combustion engine operation variables adjusted in dependence on the nitrogen storage amount and/or the temperature of the SCR catalyst, the heating gradient, and thus the desorption rate value or the $NO_2$ maximum concentration, can be influenced in a defined manner and preset or predefineable limit values can be fallen below in a reliable manner. For example, by correspondingly adjusted values of internal combustion engine operation variables, a comparatively slow heating of less than about 10° C. per min, particularly in a temperature interval of −20° C. to +40° C., a soft $NO_2$ desorption can be achieved, where critical $NO_2$ peak concentrations are avoided. The adjustment of a low heating gradient is particularly advantageous if the SCR catalyst has a temperature just below or within the desorption temperature region. It is particularly advantageous, starting with low temperatures of the exhaust gas cleaning component, that is, less than 0° C., particularly less than −20° C., to initially adjust a high heating gradient of about 20° C./min or more in a first heating step. The exposition duration of the SCR catalyst in the temperature range critical for $NO_x$ storage is thereby shortened, the further $NO_x$ storage is largely avoided and the nitrogen oxide storage amount is thus limited. If the SCR catalyst has reached a temperature just below the desorption temperature region, that is, a temperature lying below about 10° C., a low heating gradient below the heating gradient maximum value is adjusted. It is thereby advantageous to adjust the heating gradient in dependence on temperature, particularly with increasing temperature.

In a further arrangement of the invention, the estimate of the nitrogen oxide storage amount is based on an operation duration of the internal combustion engine with a temperature continuously falling below a predefineable particularly first threshold temperature for the SCR catalyst. Longer low load operation times at low temperatures have proved to be particularly critical. If, for example, the internal combustion engine is operated for a longer time in the idle run below a catalyst-specific threshold temperature of typically about 30° C., the emitted nitrogen oxides in the SCR catalyst enrich in an increasing manner. With multiple successive cold start and/or warm-up processes, where the SCR catalyst continuously has temperatures, where a storing of $NO_x$ can take place, the respectively stored NOx amounts accumulate. With a following, particularly fast heating due to an increasing internal combustion engine load, an undesired high $NO_x$ desorption can thus result. According to the invention, this is met in that the nitrogen oxide storage amount over the operation time is estimated with $NO_x$ storage in an integrating manner. The cold start engine operation method can already be initiated already before reaching a critical integral nitrogen oxide amount and a defined heating of the SCR catalyst can be achieved. For estimating the nitrogen oxide storage amount, one preferably refers back to stored emission characteristic fields of the internal combustion engine and corresponding adsorption characteristic lines. An online calculation, based on an adsorption and desorption model, can also be provided for the SCR catalyst.

In a further arrangement of the invention, a fraction of a nitrogen oxide storage capacity of the SCR catalyst is provided as the nitrogen oxide storage amount limit value. The nitrogen oxide storage capacity that can maximally be stored by the SCR catalyst is typically highly dependent on temperature and also depends on the type and/or ageing state of the SCR catalyst. It is conveniently determined empirically beforehand and is stored in a control device. An ageing dependence can thereby be considered in addition to a temperature dependence. For an SCR catalyst of the iron or zeolite type provided preferably, the nitrogen storage capacity is typically in the region of 1 g to 30 g per 1 catalyst volume at low temperatures of 0° C. and less. By means of the orientation of the nitrogen oxide storage amount limit value provided according to the invention at the nitrogen oxide storage capacity determined in such a manner, an undesired high load of the SCR catalyst is avoided. It is thereby particularly advantageous, if the fraction of the nitrogen oxide storage capacity of the SCR catalyst is provided in dependence on temperature, particularly decreasing with decreasing temperature of the SCR catalyst.

In a further arrangement of the invention, the cold start engine operation method is deactivated after reaching a predefineable second threshold temperature for the SCR catalyst. The inventors have recognized that a storage of nitrogen oxides in the SCR catalyst above a typically catalyst-specific threshold temperature is low or even negligible, wherein possibly stored nitrogen oxides can already desorb below this temperature at least approximately. If the cold start engine operation method is deactivated as fast as possible after reaching the threshold temperature, an excess fuel consumption is thereby also avoided or at least limited. If the engine load required by the user exceeds a predefineable minimum value, where it is ensured that a further heating or at least no cooling takes place, the cold start engine operation method is preferably deactivated immediately after reaching the threshold temperature. Alternatively, it can be provided to keep this activated for a certain time. It is particularly advantageous in this connection to apply the exact time of the deactivation in dependence on the engine load. It can naturally also be provided to sense a $NO_2$ desorption in a sensory manner and to deactivate the activated cold start engine operation method by terminating some of all measures taken thereby after exceeding a detected $NO_2$ desorption maximum.

In a further arrangement of the invention, a multiple injection of fuel into one or several cylinder combustion chambers of the internal combustion engine is carried out with an activated cold start engine operation method, which comprises a first pilot injection, a second pilot injection following the first pilot injection and a main injection following the second pilot injection within a work cycle of the respective cylinder. It can thereby be provided to divide the first and/or the second pilot injection into two individual injections following each other quickly. By means of the at least two pilot injections preceding the main injection, an ignition of the injected fuel is also enabled with low engine temperatures below the freezing point. Preferably, a comparatively low fuel amount of about 20% or less with regard to the main injection amount is injected in the first or in the second pilot injection. In this manner, an ignition even at very low surrounding or engine temperatures of minus 20° C. or less is enabled. Due to the low pilot injection amount, a temperature decrease caused by evaporation is at least reduced and an ignition of the homogenized pilot injection amount is improved.

It is particularly preferred in a further arrangement of the invention if the first pilot injection takes place in a crankshaft angle region of larger than 20 degrees before an upper dead center in the compression cycle of the respective cylinder. Typically, the temperature in the cylinder is too low for a conventional diffusion combustion at low temperatures of minus 20° C. or less. With the early pilot injection according to the invention, a homogenization of the mixture is enabled, whereby the ignitibility is improved. A combustion conversion of the first pilot injection takes place with a corresponding ignition delay, which leads to an increase of the temperature level in the cylinder. The fuel amount introduced with the second pilot injection can thus evaporate quickly and also ignite. A HC emission typically coinciding with the homogeneous or partial homogeneous combustion has thereby been shown to be advantageous with regard to a reduction of the nitrogen oxide amount and the $NO_2$ desorption amount. Even though the connections are not cleared up completely, it is assumed that a $NO_x$ storage is reduced by HC present with the $NO_x$ in the exhaust gas by blocking adsorption spaces. On the other hand, a reduction of gaseous and/or stored $NO_2$ and/or NO appears to take place, whereby the $NO_2$ desorption amount is also reduced. It can thus be provided to carry out a HC enrichment of the exhaust gas in a defined manner in parallel to the active cold start engine operation method and/or with a starting $NO_2$ desorption. An adjustment of a predefineable HC target concentration in the region of 80 ppm to 3000 ppm, particularly preferred in the region of 200 ppm to 1000 ppm, can thereby particularly be made. For this, the injection amount of the first and/or second pilot injection is increased correspondingly. An addition of HC into the exhaust gas outside the engine, for example by a fuel addition unit can naturally also be provided for this.

In a further arrangement of the invention, the second pilot injection takes place at a time after the start of a conversion of fuel injected by the first pilot injection. By means of the choice of the time for the second pilot injection according to the invention, the combustion progress for the fuel of the second pilot injection and the following main injection is improved.

A further improvement of the combustion progress is enabled, if the main injection takes place at a time after the start of a conversion releasing heat by of fuel injected by the second pilot injection in a further arrangement of the invention. A safe ignition is thereby ensured even with very low temperatures. In this manner, HC emissions can also be kept comparatively low even with very low outer temperatures and a defined heating of the exhaust gas cleaning system is enabled. The main injection typically only takes place behind the upper dead center of the compression cycle, particularly only after about 10 degrees crank angle behind the upper dead center. A late combustion position or a late position of the combustion center of mass results thereby. This enables a safe ignition and a defined and quick heating of the exhaust gas cleaning system and thus the preferably provided zeolite-containing SCR catalyst. A NO formation caused by combustion is additionally reduced.

In a further arrangement of the invention, the implementation of the cold engine operation method takes place in a predefineable low load region of the internal combustion engine and the cold engine operation is deactivated with an internal combustion engine load above the low load region. After the deactivation of the of the cold start engine operation method, a combustion method with dominating diffusion combustion is preferably adjusted.

Advantageous embodiments of the invention are illustrated in the drawings and are described in the following. It is obvious that the above-mentioned characteristics and which still will be explained in the following cannot only be used in the respectively given combination but also in other combinations or on their own without leaving the scope of the present invention.

BRIEF DESCRIPTION OF THE DRAWING FIGURES

It shows thereby.

DETAILED DESCRIPTION

Figure 1:
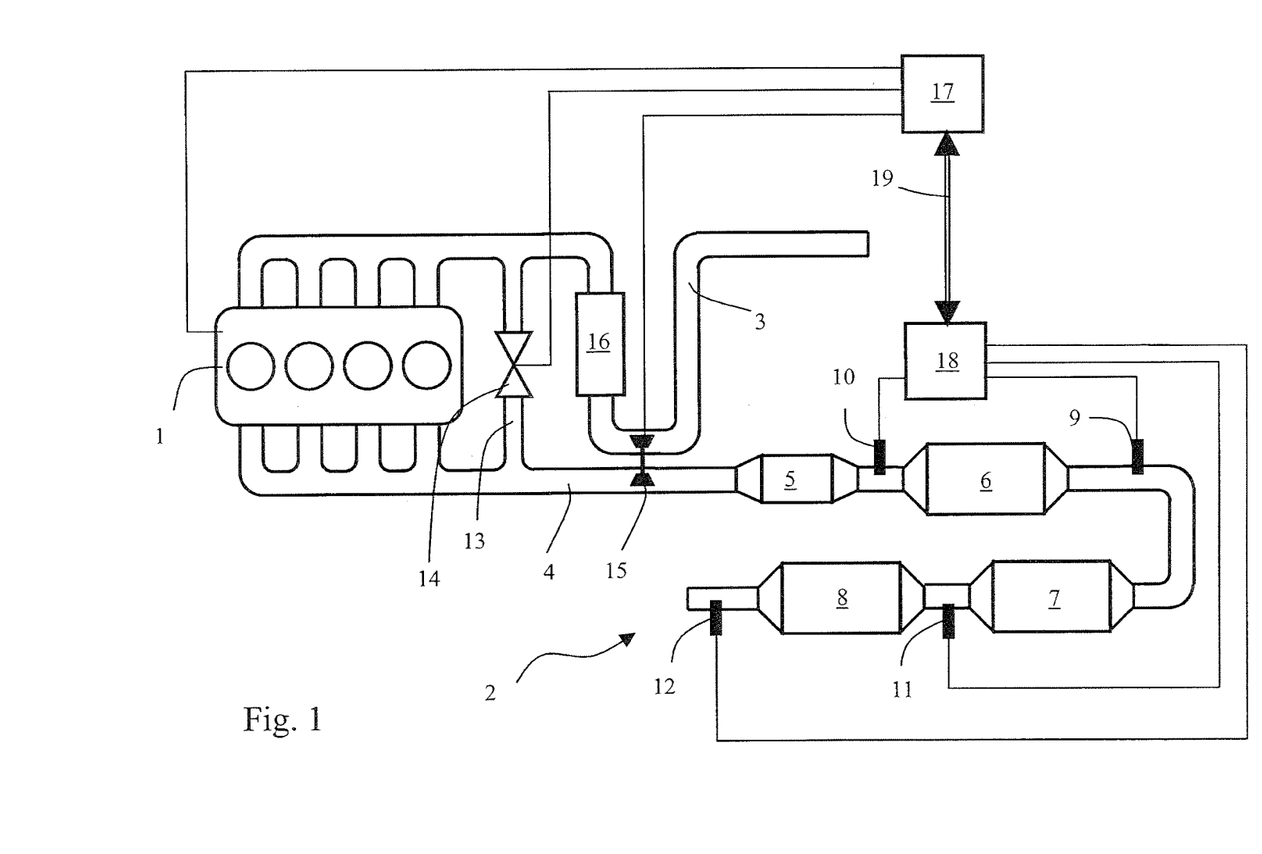
FIG. 1 an internal combustion engine with an exhaust gas cleaning system with a SCR catalyst in a schematic view, FIG. 2 a diagram with a schematic depiction of the temperature dependence of a $NO_x$ storage capacity of a typical zeolite SCR catalyst, FIG. 3 a diagram with a schematic depiction of $NO_x$ desorption characteristic lines for a catalyst loaded with different NOx storage amounts according to FIG. 2, FIG. 4 a further diagram with $NO_2$ desorption characteristic lines shown schematically, achieved with different heating gradients for a catalyst loaded with NOx according to FIG. 2, and FIG. 5 a diagram with a schematic depiction of a heat release in a cylinder of the Diesel engine and actuation pulses $I_{Injek}$ of the corresponding fuel injector in dependence on time.

FIG. 1 schematically shows an advantageous embodiment of a system of an internal combustion engine 1 and an exhaust gas cleaning system 2 for a motor vehicle, not shown. The internal combustion engine 1 is presently designed as a directly injecting air-compressing internal combustion engine according to the piston principle, called Diesel engine in the following in a simplified manner. An assigned fuel injection system (not shown), is preferably designed as a so-called common rail system with an adjustable rail pressure or fuel injection pressure.

A combustion chamber with one or two inlet and outlet valves, a glow plug and a fuel injector and one or several inlet channels for the combustion air are respectively assigned to the cylinders of the Diesel engine 1, which is not shown in detail. The fuel injectors are thereby provided with adjustable injection amounts for carrying out multiple injections. The inlet and outlet valves can preferably be operated with adjustable control times and adjustable opening lift.

The Diesel engine 1 obtains its combustion air via an air supply line 3, in which an air mass meter (not shown) is arranged. By means of an adjustable throttle element in the air supply line, also not shown, the air mass flow supplied to the Diesel engine 1 can be throttled to an adjustable measure. The combustion air is compressed by means of an exhaust gas turbocharger 15 and supplied to a charge-air cooler 16 for cooling. Preferably, means for lifting the temperature level, not shown in detail, of the combustion air supplied to the Diesel engine are provided, particularly in connection with a cold start or warm-up. A bypass of the charge-air cooler 16 is preferably provided as required. For the active lift of the combustion air temperature, a heating device can be provided in the air supply line. An active heating by means of a so-called grid heater is particularly preferred, which is preferably arranged in an exhaust gas return line 13 before its feed into the air supply line 3. The exhaust gas turbocharger 15 is preferably designed as a so-called VTG charger or as a waste gate charger with adjustable charge pressure.

Exhaust gas generated in the combustion chambers of the cylinders of the Diesel engine 1 is emitted via an exhaust gas line 4. Thereby, exhaust gas can be admixed to the combustion air via the exhaust gas return line and thus be returned to the Diesel engine 1. The part of the returned exhaust gas (AGR rate) can be adjusted via an AGR valve 14. The exhaust gas returned to the Diesel engine is preferably cooled by means of an AGR cooler, not shown, wherein a possibly adjustable bypass can be provided for the AGR cooler. Thereby, cooled or hot or heated exhaust gas can optionally be admixed to the combustion air. Exhaust gas that has not been returned is supplied to the exhaust gas cleaning system via the exhaust gas turbocharger 15. Furthermore, an adjustable throttle element, not shown, is preferably provided in the exhaust gas line 4 downstream of the exhaust gas turbocharger 15.

With the described preferred embodiment, different values for the essential engine operation parameters as e.g., air mass flow, injection time, amount pressure and time of different fuel injections, AGR rate, charge-air pressure, cylinder filling and thus different combustion methods can be represented according to requirement. A further enlargement of the variability can be provided in the form of an adjustable compression ratio.

A preferred embodiment of the exhaust gas cleaning system 2 assigned to the Diesel engine 1 comprises, seen in the flow direction of the exhaust gas in this sequence a first oxidation catalyst 5, a second oxidation catalyst 6, a particle filter 7 and a SCR catalyst 8. A so-called wallflow filter based on SiC, cordierite or aluminum titanate is preferably used. The particle filter can, however, also be formed as a sinter metal filter or as a filter unit with an open filter structure. The catalysts 5, 6, 8 are preferably designed as honeycomb monoliths, which are passed through by catalytically coated channels, through which the supplied exhaust gas can flow. The SCR catalyst is preferably designed as a coated support catalyst with a copper- or iron-containing zeolite coating. Due to this embodiment, the SCR catalyst 8 has the property to be able to store exhaust gas components, particularly HC, NOx and $NH_3$. The essential property is, however, to be able to catalyze a selective reduction of NOx to $N_2$ by means of stored or supplied $NH_3$ as reaction partner under oxidizing conditions. A supply of $NH_3$ preferably takes place via a dosing device, not shown, via which a solution containing urea can be injected into the exhaust gas upstream of the SCR catalyst 8. Urea injected into the exhaust gas thereby breaks down with a release of $NH_3$.

On the input side of the first oxidation catalyst 5 and/or the second oxidation catalyst 6, a fuel supply unit can be provided, via which fuel can be supplied to the exhaust gas as fuel. This enables an enrichment of the exhaust gas with fuel or HC. Due to the exothermal oxidation of fuel supplied to the exhaust gas according to requirement, a defined heating of the exhaust gas, for example in connection with an active regeneration of the particle filter 7 is enabled by thermal soot combustion.

Different temperature and exhaust gas sensors for sensing exhaust gas and component temperatures and of concentrations of important exhaust gas components are provided in the exhaust gas aftertreatment device 2. For example, respectively one temperature sensor 10, 11 are arranged in the exhaust gas cleaning system 2 in FIG. 1 on the input side of the second oxidation catalyst 6 and on the output side of the particle filter 7. On the output side of the second oxidation catalyst 6 and of the SCR catalyst 8 are provided gas sensors 9, 12 sensitive with regard to NOx and/or $NH_3$. For determining the loading of the particle filter 7 with soot and/or ash, it is additionally preferred to provide pressure sensors or a differential pressure sensor on the input and output side of the particle filter 7, as is not specially shown in FIG. 1. By means of these and possibly further sensors, the operating state of the exhaust gas cleaning system 2 can be determined comprehensively and the operation of the Diesel engine 1 can possibly be adapted.

For adjusting or for sensing the engine operation, an electronic engine control device 17 is provided. The engine control device obtains information about relevant engine operating variables (e.g., speed, engine load, temperatures, pressures) from the respective sensors or detectors and can emit control signals as adjustment variables to actuators (e.g., to the AGR valve 14, the exhaust gas turbocharger 15 or the throttle element in the air supply line 3). A regulation ability of operating or state variables of the gas supply side and of the fuel supply side is provided. The engine control device 17 has the ability to actuate the fuel injectors for carrying out multiple injections and possibly to adjust the fuel injection pressure as required. The engine control device 17 is further equipped for carrying out regulation and control processes, with which engine operating variables are adjusted in a regulated or controlled manner. The engine control device 17 can fall back to stored characteristic fields or calculation or regulation or control routines for this. Sub-systems provided for this, such as calculators, stores or input-output units and the like are not represented separately.

In an analogous manner, a second control device 18 is provided for sensing and adjusting operation and state variables of the exhaust gas aftertreatment device 2. The engine control device 17 and the second control device 18 are connected to each other by means of a bi-directional data line 19, which allows a mutual exchange of data available by a respective control device. It is obvious that the control devices 17, 18 can also be combined in a single integral measuring sensing and control unit.

In the shown preferred embodiment, an optimum operation of the Diesel engine and a comprehensive cleaning of the exhaust gases emitted thereby is enabled. An exhaust gas cleaning in the desired extent is, however, only enabled if the exhaust gas catalysts 5, 6, 8 are at their operating temperature. Below a so-called start-up temperature, a reduced or missing catalytic activity is given, when, particularly in connection with a cold start or a warm-up, special measures are necessary, in order to avoid or to at least reduce an undesired contaminant emission to the environment. In the following, a reduction of the emission of nitrogen dioxide ($NO_2$) at temperatures below a start-up temperature of the SCR catalyst 8 is discussed. The measures mentioned in the following particularly relate to a reduction of the $NO_2$ emission with surrounding temperatures below or near the freezing point or at temperatures of the catalyst 8 below a threshold temperature specific for an adsorption of NOx or desorption of $NO_2$ which is in the region of typically 10° C. to 50° C. for the preferably used embodiments.

Figure 2:
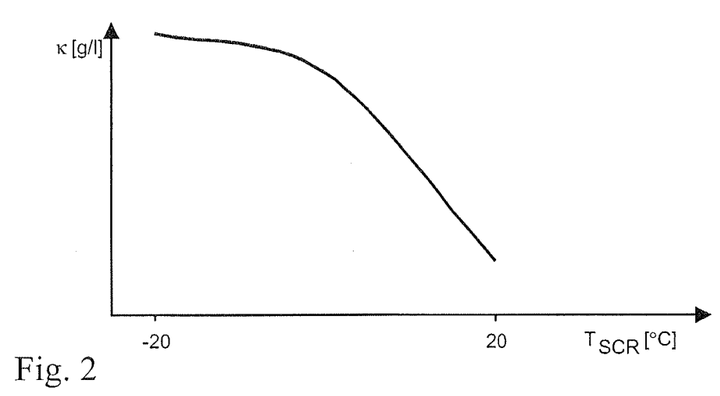
Figure 3:
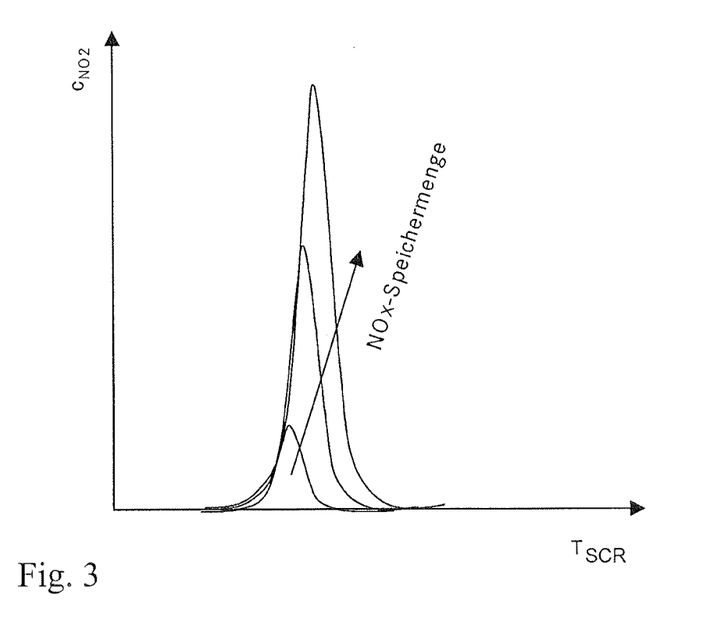
Figure 4:
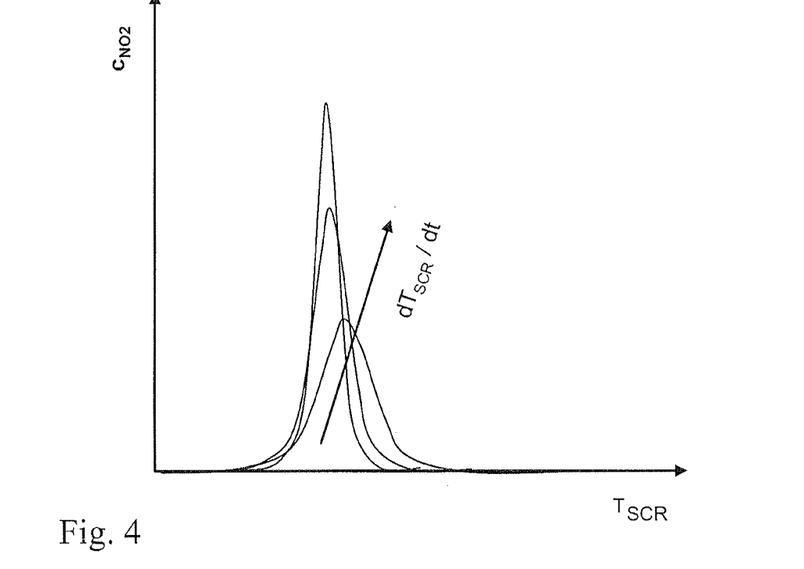

Before preferred measures for avoiding an undesired $NO_2$ emission are discussed in detail, the basic phenomenons are first explained with regard to FIGS. 2 to 4.

The diagram of FIG. 2 shows the temperature dependence of a NOx storage capacity κ of a typical SCR catalyst on the basis of zeolite. As can be seen, the NOx storage capacity κ, that is, the amount of NOx that can be stored in the SCR catalyst, increases with decreasing temperature $T_{SCR}$. Thereby, an increasing saturation behavior is noted with decreasing temperatures. Even though the temperature dependence of the NOx storage capacity κ can be formed differently depending on the type and extent of the catalytic zeolite coating, values in the region of 0.5 to 30 grams $NO_2$ per liter catalyst volume, particularly from 1 to 20 g/l are to be viewed as typical for the NOx storage capacity κ in the temperature region of +20 to minus 20° C. Maximum values of about 20 g/l are particularly characteristic for customary catalyst designs with temperatures of $T_{SCR}$<15° C. The NOx storage capacity κ can typically be neglected above a catalyst-specific threshold temperature of about +10 to +50° C., particularly from about +30° C.

The NOx storage capacity κ verified by the inventors results in that, with an engine operation, where the SCR catalyst 8 falls below the threshold temperature, nitrogen oxides present in the exhaust gases are stored to a more or less extent. Corresponding engine operating states comprise, for example, one or several successive cold start processes, to which can respectively connect low load phases or warm-up phases. If a higher load is required by the Diesel engine 1 after these engine operating states, a heating of the SCR catalyst 8 occurs due to the more heated exhaust gas, which can lead to an undesired desorption of previously stored nitrogen oxides, even before the SCR catalyst 8 reaches its start-up temperature. Nitrogen oxides are thereby mainly absorbed as $NO_2$ and are emitted to the environment. The inventors have noticed that the extent of the $NO_2$ desorption is dependent on the nitrogen oxide amount stored in the SCR catalyst 8 and on the heating speed of the SCR catalyst in a relevant manner, which is explained in the following by means of FIGS. 3 and 4.

In the diagram of FIG. 3, $NO_2$ desorption characteristic lines are schematically shown for a SCR catalyst loaded with different NOx storage amounts according to FIG. 2. Courses of $NO_2$ concentrations $c_{NO2}$ measured in the exhaust gas on the output side of the SCR catalyst in dependence on the temperature $T_{SCR}$ of the SCR catalyst are plotted thereby. With the corresponding experiments, the SCR catalyst was loaded with different NOx amounts at temperatures below the threshold temperature relevant for a NOx adsorption and subsequently heated with an approximately constant heating rate. As shown, $NO_2$ desorption peaks occur in a characteristic desorption temperature region, which have an increasing height with an increasing NOx storage amount. Even though the desorption temperature region is dependent on the type of the catalytic zeolite coating, values in the region of +10° C. to 60° C., particularly from +20° C. to +50° C. are to be viewed as typical for the occurrence of the $NO_2$ concentration maximum.

It was further noticed that the $NO_2$ desorption rate or the height or the width of the $NO_2$ desorption peak depends on the heating speed, that is, on the size of the heating gradient, as can be shown by means of FIG. 4. In the diagram of FIG. 4, analogous to the diagram of FIG. 3, are schematically shown NO$_2$ desorption characteristic lines for an SCR catalyst loaded respectively with the same NO$_x$ storage amounts according to FIG. 2. A heating thereby took place after the loading of the SCR catalyst with approximately constant, but different heating rates dT$_{SCR}$/dt. Analogously to the curve progressions shown in the diagram of FIG. 3, NO$_2$ desorption peaks occur in a characteristic desorption temperature region, which peaks have an increasing height and a decreasing width with an increasing heating gradient dT$_{SCR}$/dt.

Due to the results shown in the diagrams of FIGS. 2 to 4 of corresponding basic experiments, strategies for avoiding an undesirably high NO$_x$ release with a cold start and/or a warm-up of the Diesel engine were developed, which aim according to the invention to limit a storage of NO$_x$ in the SCR catalyst 8 with regard to the amount. This is achieved in that an estimate of the amount of NOx stored in the SCR catalyst 8 takes place and a defined heating of the SCR catalyst 8 is carried out by means of correspondingly heated exhaust gas, if the estimate results that the NO$_x$ storage amount exceeds a predefineable NO$_x$ storage amount limit value. In this manner, a storage of critically high amounts of NO$_x$ is avoided and a desorption of NOx stored in the SCR catalyst 8 is forced at a time, before the NOx storage amount reaches such a critical level that a heating occurring later would result in undesirably high NO$_2$ peaks. On the other hand, heating measures explained in the following in more detail are carried out in such a manner that a predefineable desorption rate value for NO$_2$ desorbing from the SCR catalyst 8 for a rate resulting due to the heating of the SCR catalyst 8 or a predefineable maximum concentration of NO$_2$ is fallen below.

For estimating the NO$_x$ storage amount in the SCR catalyst 8, it is provided according to the invention to sense the number of successive cold start and warm-up processes, where a predefineable threshold temperature is continuously or mainly fallen below. The NO$_x$ amount thereby emitted by the Diesel engine 1 and stored in the SCR catalyst 8 is also determined. For this, one preferably refers back to stored emission characteristic fields of the Diesel engine 1, in which are stored values for the NO$_x$ raw emission in dependence on relevant engine operation parameters. In connection with adsorption and desorption characteristic lines also stored corresponding to the diagrams shown in FIGS. 2 to 4, a summing of NOx amounts stored in respective cold start and warm-up processes in the SCR catalyst is enabled. If the estimate results in that the NOx storage amount exceeds a NOx storage amount limit value, which particularly exceeds a predefineable fraction of NOx storage capacity κ of the SCR catalyst 8 in particular in dependence on the temperature of the SCR catalyst 8 and/or the exhaust gas throughput, heating measures are activated, which are preferably controlled in such a manner that a predefineable heating gradient maximum value for a heating gradient of the SCR catalyst 8 is fallen below particularly in or close below the desorption temperature region. The heating gradient maximum value is preferably fixed in dependence on NOx storage amount and/or temperature of the SCR catalyst 8 in such a manner that the NOx maximum concentration falls below a predefineable value in the exhaust gas emitted to the environment. This value for the NO$_2$ maximum concentration preferably corresponds to a visibility limit of NO$_2$. Typical values for the NO$_x$ storage amount limit value are about 10% to 30% of the NO$_x$ storage capacity κ of the SCR catalyst 8. Typical values for the heating gradient maximum value are about 5 to 20° C. per min.

According to the invention, several normally adjusted engine operation variables are changed in such a manner for a defined heating of the SCR catalyst 8 with a cold start and/or with a subsequent warm-up, that a more heated exhaust gas results compared to the normal operation. Preferably, one or more of the following measures are applied in a method designated as cold start engine operation method in the following:

closing the throttle element arranged in the exhaust gas line 4 corresponding to a reduction of the free flow-through cross section by 10% to 95%, particularly depending on load, with a higher throttling at a low load. A closure of the throttle element in such a manner is particularly preferred in that a retention pressure of 1 bar to 4 bar, particularly of 2 bar to 3 bar results.

closing the throttle element arranged in the air supply line 3 corresponding to a reduction of the free flow-through cross section by 10% to 95%, preferably 30% to 70%.

reducing the charging pressure supplied by the exhaust gas turbocharger, possibly up to reaching the running limit or a predefineable soot limit, preferably corresponding to a blackening number of 1 or higher.

actuating the grid heater in the AGR line.

changing the control time of the outlet valves of one or several cylinders of the Diesel engine 1 in such a manner that the outlet valve opens in the region of 10° KWnOT to 75° KWnOT, preferably 40° KWnOT to 65° KWnOT.

closing the AGR valve 14, preferably completely at least temporarily, on request temporarily or opening gradually until an opening degree applied for the normal operation.

carrying out a first pilot injection, a second pilot injection following the first pilot injection and a main injection following the second pilot injection of fuel into the cylinders of the Diesel engine in such a manner that a center of mass position of the fuel combustion results after the dead center of the compression cycle.

Particularly with low outer temperatures −10° C. or less, it is preferred if a special adjustment of fuel injection parameters takes place for a cold start and a warm-up or cold-run phase connected thereto corresponding to the last-mentioned point, as explained in more detail in the following with reference to the diagram shown in FIG. 5.

Figure 5:
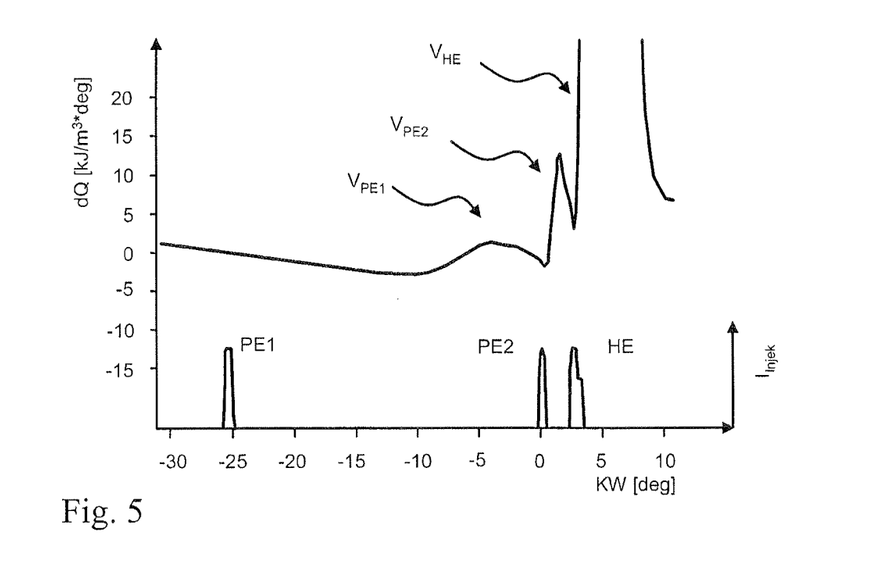

In the diagram of FIG. 5, a heat release dQ in a cylinder of the Diesel engine 1 are shown schematically in the upper part and actuation pulses I$_{Injek}$ of the corresponding fuel injector in dependence on time, re-standardized to degree crank angle KW in the lower part.

The cold start engine operation method with correspondingly chosen injection parameters according to the invention is designed as a partial homogeneous combustion method with at least two pilot injections PE1, PE2 and at least one main injection HE of fuel into the combustion chambers of the Diesel engine. The first pilot injection PE1 thereby preferably takes place in the compression cycle at an early time, so that a mainly homogeneous ignitable air fuel mixture results during the further course of the compression cycle and a homogeneous combustion of the homogeneous mixture with a heat release after a certain ignition delay, characterized by the arrow designated with V$_{PE1}$.

The second pilot injection PE2 preferably takes place approximately at the upper dead center of the compression cycle at a time where a clear temperature increase has occurred in the combustion chamber due to the combustion of the previously injected fuel amount of the first pilot injection PE1. The main injection takes place offset to the second pilot injection analogous to a time, where a further distinct heat release, characterized by the arrow designated with V$_{PE2}$ has occurred in the combustion chamber due to the combustion of the previously injected second pilot injection PE2. An ignition of the injected fuel is ensured in this manner even with very low temperatures of −20° C. and less.

The combustion of the main injection HE preferably takes place in a conventional diffusion combustion. It can thereby be provided to divide the main injection HE into several partial injections in such a manner that a scaled combustion results. It is thereby particularly preferred if the injection amount of each partial injection of the main injection HE is adjusted to be larger than the injection amount of the previous partial injection.

The first pilot injection PE1 preferably takes place in a crank angle region of 20° KWvOT to 40° KWvOT. The injection amount of the first pilot injection PE 1 is thereby preferably chosen approximately in the region of 5% to 25% of the injection amount of the main injection HE. The second pilot injection PE2 preferably takes place in the region of the upper dead center in a crank angle region of 5° KWvOT to 5° KWnOT, but at the earliest after the ignition of the fuel injected with the first pilot injection PE1. The injection amount of the second pilot injection PE2 is thereby preferably chosen approximately in the region of 2% to 15% of the injection amount of the main injection HE.

Deviating from the representation shown in FIG. 5, the injection start of the main injection HE is typically chosen in a crank angle region of 5° KWnOT to 20° KWnOT, so that a comparatively late combustion position results. The emission heating can thereby be adjusted in a defined manner with a time of the actuation start for the fuel injector, so that the intended heating rate of the SCR catalyst 8 can be achieved in a reliable manner. With a division of the main injection HE into two partial injection possibly carried out, the second partial injection takes place abutting the first partial injection in a crank angle region of 25° KWnOT to 60° KWnOT. Thereby, a comparatively late position of the combustion center of mass results with about 20° KWnOT, whereby a defined heating of the exhaust gas cleaning system 2 and of the SCR catalyst 8 is enabled. A further displacement to late of the combustion center of mass is preferably provided with an increasing engine load.

With the cold start engine operation method, a defined heating of the exhaust gas cleaning system and especially of the SCR catalyst 8 is enabled even with very low temperatures and low engine loads. A heating for avoiding undesirably high $NO_2$ desorption peaks is thereby also enabled independently of the adjustment of certain vehicle states. It is provided according to the invention to deactivate the cold start engine operation method when reaching a predefineable threshold temperature for the SCR catalyst 8. A deactivation is thereby meant to be the terminating of at least one part of the above-mentioned measures. The limitation of an excess fuel consumption caused by the cold start engine operation is thereby enabled. A deactivation of the cold start engine operation method is also provided if the engine load exceeds a preset or predefineable limit value of about 30% of the nominal load. In this case, a natural heating of the exhaust gas cleaning system 2 and of the SCR catalyst 8 often takes place in any case.

The invention claimed is:

1. A method for operating an internal combustion engine comprising an exhaust gas cleaning system having an SCR catalyst with a catalytic zeolite coating, which can catalyze a selective reduction of nitrogen oxides using ammonia under oxidizing conditions, comprising:
    estimating a nitrogen oxide storage amount of nitrogen oxides stored in the catalytic zeolite coating of the SCR catalyst; and
    activating a cold start engine operation method for the internal combustion engine when the estimate indicates that the nitrogen oxide storage amount exceeds a predefined nitrogen oxide storage amount limit value,
    wherein the cold start engine operation method heats the SCR catalyst in conjunction with a cold start or a warm-up of the internal combustion engine, and the cold start engine operation method has predefined values for predefined internal combustion engine operation variables.

2. The method according to claim 1, wherein when the cold start engine operation is activated, values of internal combustion engine operation variables are predefined in such a manner that the SCR catalyst is heated by exhaust gases emitted by the internal combustion engine in such a manner that a predefined desorption rate value for a rate of nitrogen dioxide desorbing from the SCR catalyst results due to the heating of the SCR catalyst or a predefined maximum concentration of nitrogen dioxide in the exhaust gas emitted to the environment is fallen below.

3. The method according to claim 2, wherein the maximum concentration is selected in such a manner that a nitrogen dioxide visibility limit is fallen below.

4. The method according to claim 1, wherein when heating the SCR catalyst, a heating gradient of the SCR catalyst falls below a predefined heating gradient maximum value.

5. The method according to claim 4, wherein heating gradient of the SCR catalyst falls below the predefined heating gradient maximum value with a heating starting from temperatures below zero degrees Celsius within a desorption temperature region and where a desorption of nitrogen dioxide from the catalytic zeolite coating of the SCR catalyst occurs.

6. The method according to claim 5, wherein within a desorption temperature region of 10° C. to 60° C., the heating gradient of the SCR catalyst falls below a heating gradient maximum value of 20° C. per minute.

7. The method according to claim 1, wherein the estimate of the nitrogen oxide storage amount is based on an operation duration of the internal combustion engine with a temperature continuously falling below a predefined first threshold temperature for the SCR catalyst.

8. The method according to claim 1, wherein a fraction of a nitrogen oxide storage capacity of the catalytic zeolite coating of the SCR catalyst is predefined as the nitrogen oxide storage amount limit value.

9. The method according to claim 8, wherein a value of 30% or less is predefined as the fraction of the nitrogen oxide storage capacity.

10. The method according to claim 1, wherein the cold start engine operation method is deactivated after reaching a predefined second threshold temperature for the SCR catalyst.

11. The method according to claim 1, wherein a multiple injection of fuel into at least one cylinder combustion chamber of the internal combustion engine is performed with an activated cold start engine operation method, which comprises a first pilot injection, a second pilot injection following the first pilot injection and a main injection following the second pilot injection within one working cycle of the at least one cylinder.

12. The method according to claim 11, wherein the first pilot injection occurs in a crank angle region of larger than 20 degrees before an upper dead center in a compression stroke of the at least one cylinder combustion chamber.

13. The method according to claim 12, wherein the second pilot injection occurs at a point after a start of a heat releasing conversion of fuel injected by the first pilot injection.

14. The method according to claim 11, wherein the second pilot injection occurs in a crank angle region of 5 degrees before to 5 degrees after the upper dead center of a compression stroke of the at least one cylinder combustion chamber.

15. The method according to claim 11, wherein an injection amount of the second pilot injection is smaller than an injection amount of the first pilot injection.

16. The method according to claim 11, wherein the main injection occurs at a point after a start of a heat releasing conversion of fuel injected by the second pilot injection.

17. The method according to claim 11, wherein the second pilot injection occurs in a crank angle region of 5 degrees before to 5 degrees after an upper dead center of a compression stroke of the at least one cylinder combustion chamber.

18. The method according to claim 1, wherein the cold start engine operation method is performed for a predefined low load region of the internal combustion engine and the cold start engine operation method is deactivated with an internal combustion engine load above the low load region.

19. The method according to claim 11, wherein the cold start engine operation method is performed for a predefined low load region of the internal combustion engine and the cold start engine operation method is deactivated with an internal combustion engine load above the low load region.

20. The method according to one of claim 11, wherein the estimate of the nitrogen oxide storage amount is performed with the SCR catalyst arranged downstream of a particle filter in the exhaust gas cleaning system.

* * * * *